US012595697B2

(12) United States Patent
Poupart

(10) Patent No.: US 12,595,697 B2
(45) Date of Patent: Apr. 7, 2026

(54) HINGE COMPRISING AN UNLOCKING MEMBER

(71) Applicant: DECATHLON, Villeneuve d'Ascq (FR)

(72) Inventor: François Poupart, Villeneuve d'Ascq (FR)

( * ) Notice: Subject to any disclaimer, the term of this patent is extended or adjusted under 35 U.S.C. 154(b) by 625 days.

(21) Appl. No.: 17/964,946

(22) Filed: Oct. 13, 2022

(65) Prior Publication Data

US 2023/0120128 A1 Apr. 20, 2023

(51) Int. Cl.
*E05D 11/10* (2006.01)
*B62K 15/00* (2006.01)

(52) U.S. Cl.
CPC ........ *E05D 11/1057* (2013.01); *B62K 15/006* (2013.01)

(58) Field of Classification Search
CPC ........................... E05D 11/1057; B62K 15/006
USPC ...................................................... 280/491.1
See application file for complete search history.

(56) References Cited

U.S. PATENT DOCUMENTS

| | | | | |
|---|---|---|---|---|
| 5,440,948 A | * | 8/1995 | Cheng ................. | B62K 15/006 280/278 |
| 5,492,350 A | * | 2/1996 | Pan ...................... | B62K 15/006 280/278 |
| 8,894,084 B1 | * | 11/2014 | Yap ...................... | B62K 15/008 280/278 |
| 10,112,674 B2 | * | 10/2018 | Sotir ........................ | B62J 11/19 |
| 11,148,747 B2 | * | 10/2021 | Poupart ................. | B62K 21/12 |

| | | | | |
|---|---|---|---|---|
| 12,054,219 B2 | * | 8/2024 | Demond ................. | B62M 6/90 |
| 2009/0317178 A1 | * | 12/2009 | Wang ................... | B62K 15/006 403/150 |
| 2022/0234673 A1 | * | 7/2022 | Wang ................... | B62K 15/006 |

FOREIGN PATENT DOCUMENTS

| | | | | |
|---|---|---|---|---|
| CN | 201235892 Y | * | 5/2009 | |
| CN | 101973338 A | | 2/2011 | |
| CN | 201825190 U | | 5/2011 | |
| CN | 202089184 U | | 12/2011 | |
| CN | 102407909 A | | 4/2012 | |
| CN | 105015678 A | | 11/2015 | |
| CN | 214029002 U | | 8/2021 | |
| CN | 114901546 A | * | 8/2022 | ........... B62K 15/006 |

(Continued)

OTHER PUBLICATIONS

English language abstract of CN 201825190.

(Continued)

*Primary Examiner* — James A Shriver, II

(57) ABSTRACT

A hinge including a first tube portion and a second tube portion pivotable with respect to the first tube portion between an unfolded position and a folded position; a locking element mounted pivotably to the first tube portion between a closed position in which the locking element retains the second tube portion in the unfolded position and an open position in which the locking element allows the displacement in the folded position of the second tube portion; an unlocking member configured to bring the locking element from the closed position into the open position when the unlocking member is placed in an active position; and a device for actuating the unlocking member, configured to bring the unlocking member into the active position.

22 Claims, 8 Drawing Sheets

(56)        References Cited

FOREIGN PATENT DOCUMENTS

| CN | 114932970 | A | * | 8/2022 | ........... B62K 15/006 |
|---|---|---|---|---|---|
| CN | 116674686 | A | * | 9/2023 | |
| CN | 116902121 | A | * | 10/2023 | |
| CN | 117485456 | A | * | 2/2024 | |
| CN | 117963057 | A | * | 5/2024 | ........... B62K 15/006 |
| CN | 119079002 | A | * | 12/2024 | |
| DE | 102011052134 | B4 | * | 2/2013 | ........... B62K 15/006 |
| DE | 102017207551 | A1 | * | 11/2017 | ............. B62J 11/13 |
| DE | 202024000055 | U1 | * | 3/2024 | |
| EP | 2689995 | A1 | * | 1/2014 | ........... B62K 15/006 |
| EP | 3670314 | A1 | * | 6/2020 | ............. B62K 15/00 |
| EP | 4166436 | A1 | * | 4/2023 | ........... B62K 15/006 |
| FR | 3137054 | A1 | * | 12/2023 | ............. B62H 5/02 |
| JP | 2009214756 | A | * | 9/2009 | |

OTHER PUBLICATIONS

English language abstract of CN 101973338.
English language abstract of CN 105015678.
English language abstract of CN 202089184.
English language abstract of CN 214029002.
English language abstract of CN102407909.

* cited by examiner

[Fig. 1]
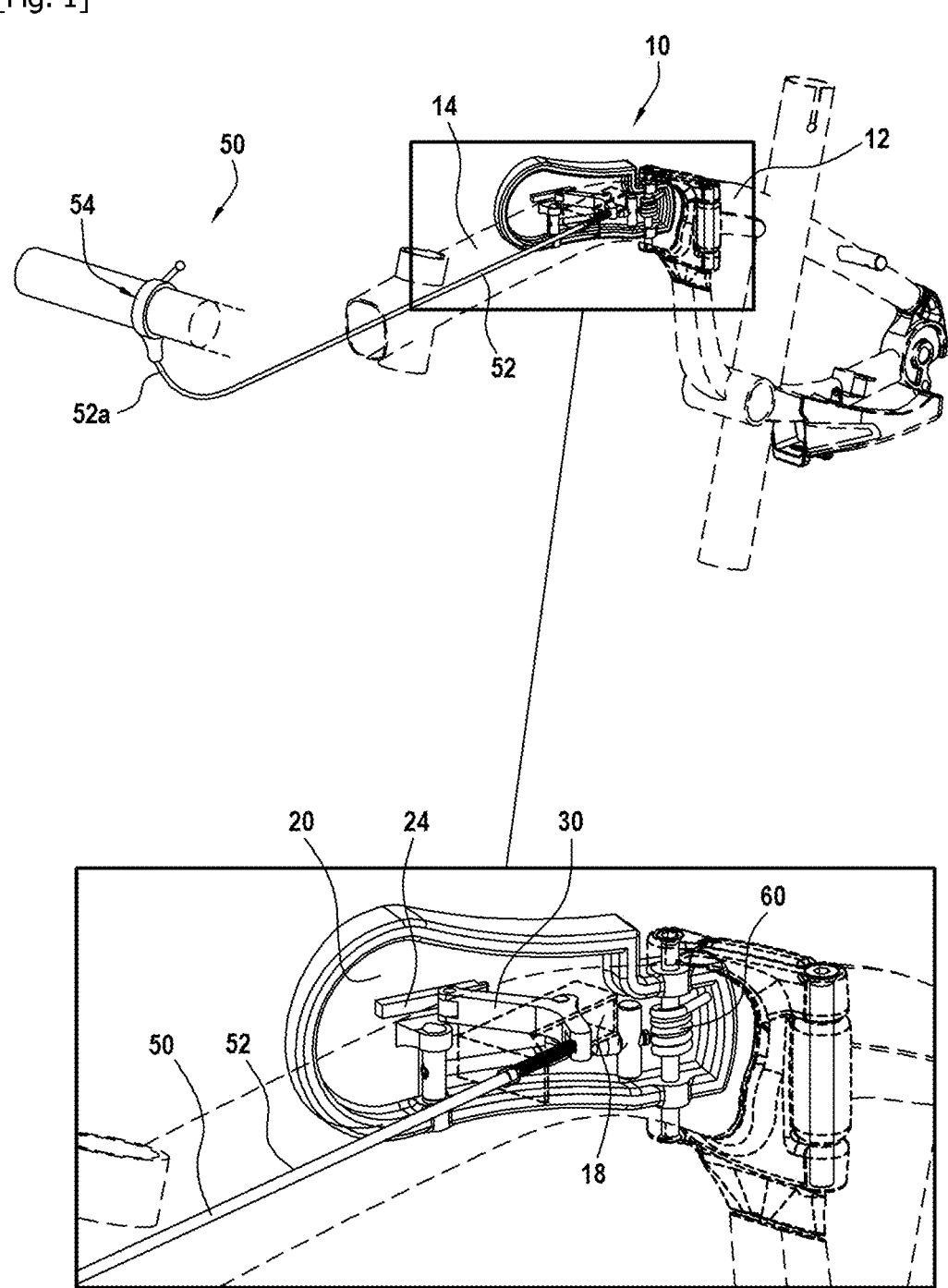

[Fig. 2]
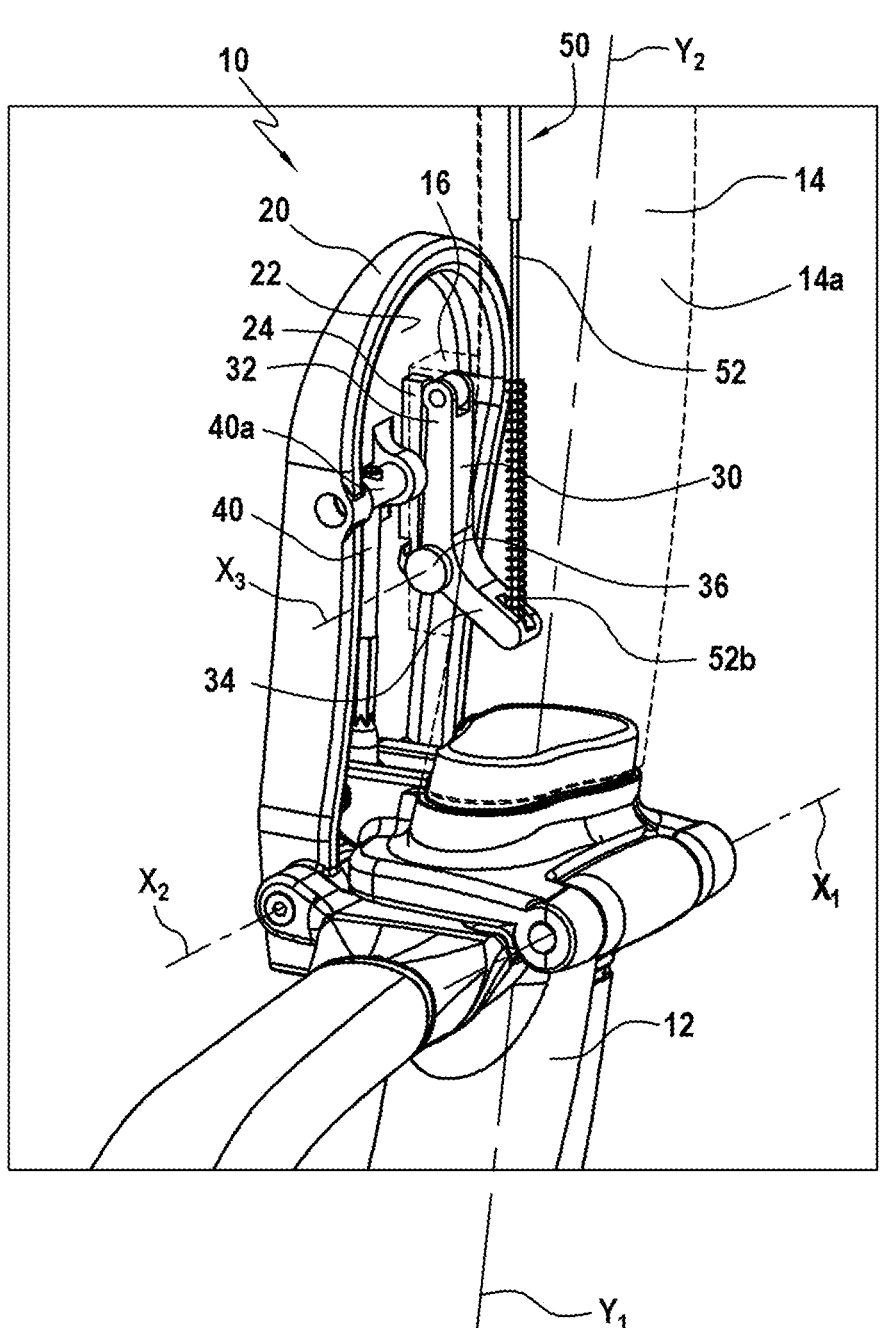

[Fig. 3]
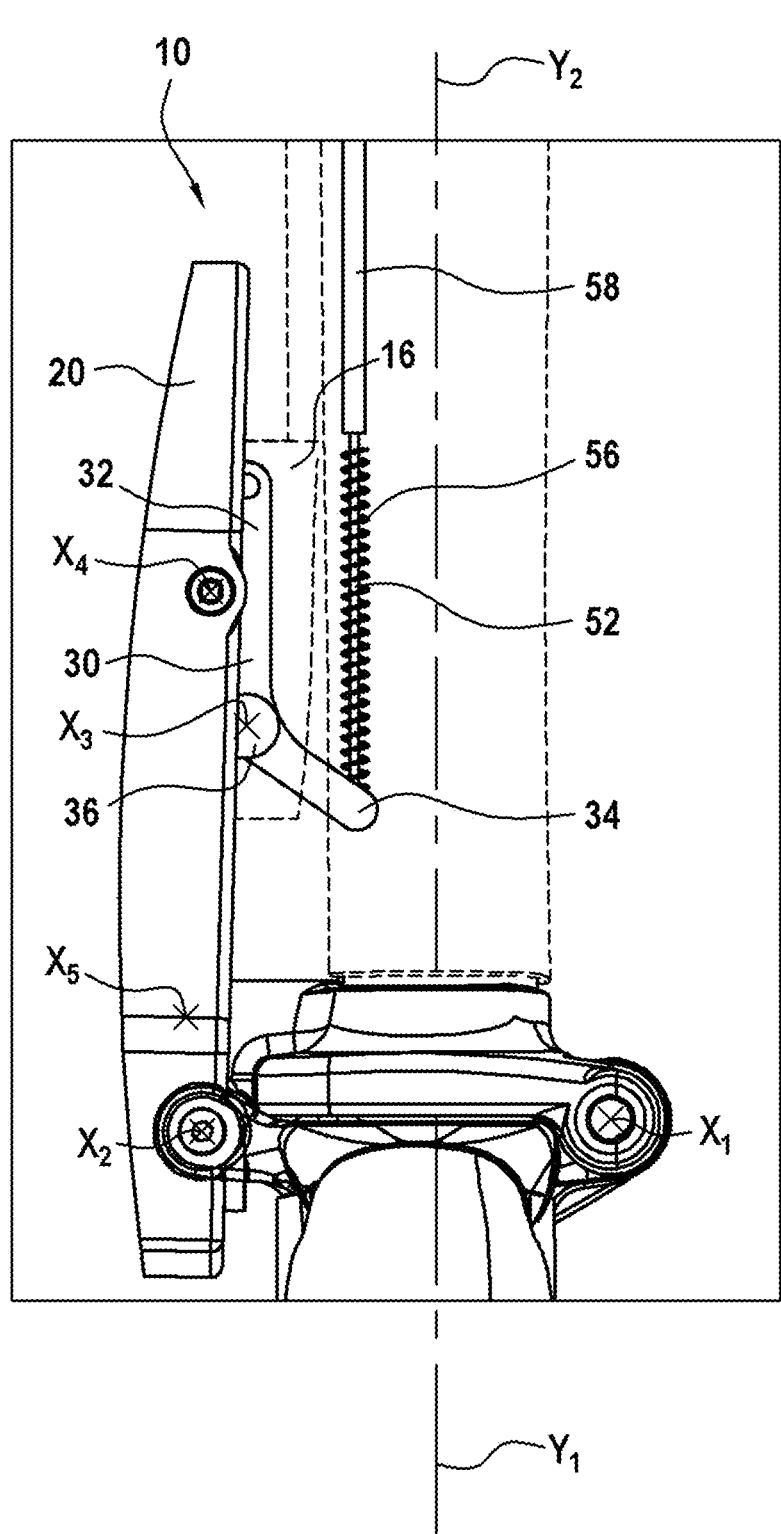

[Fig. 4]
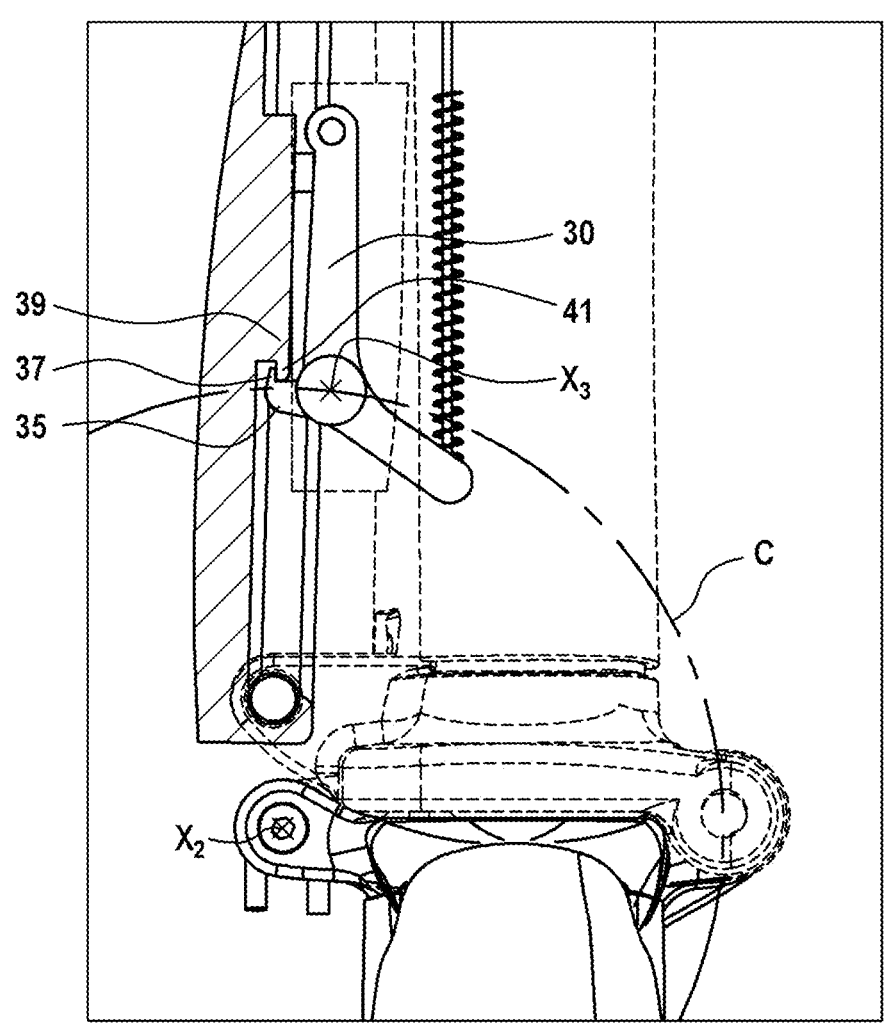

[Fig. 5]
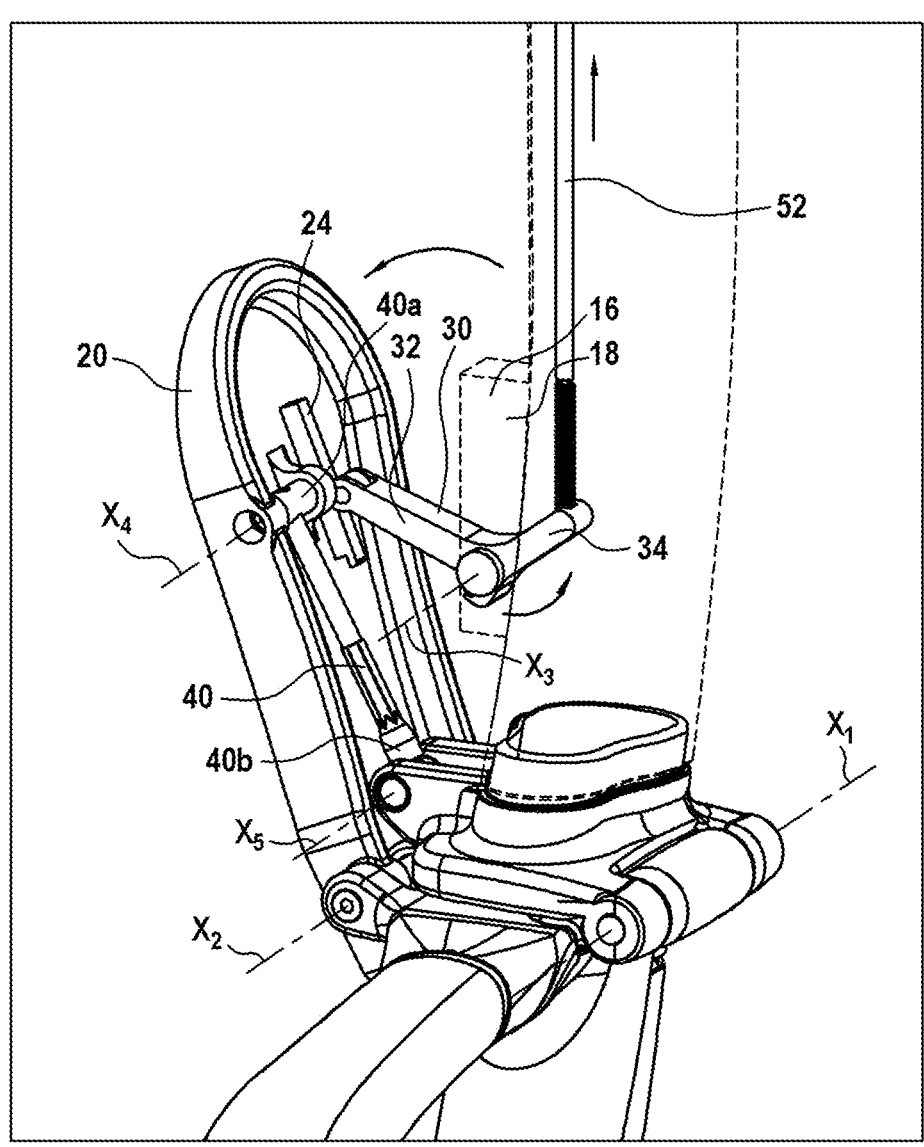

[Fig. 6]
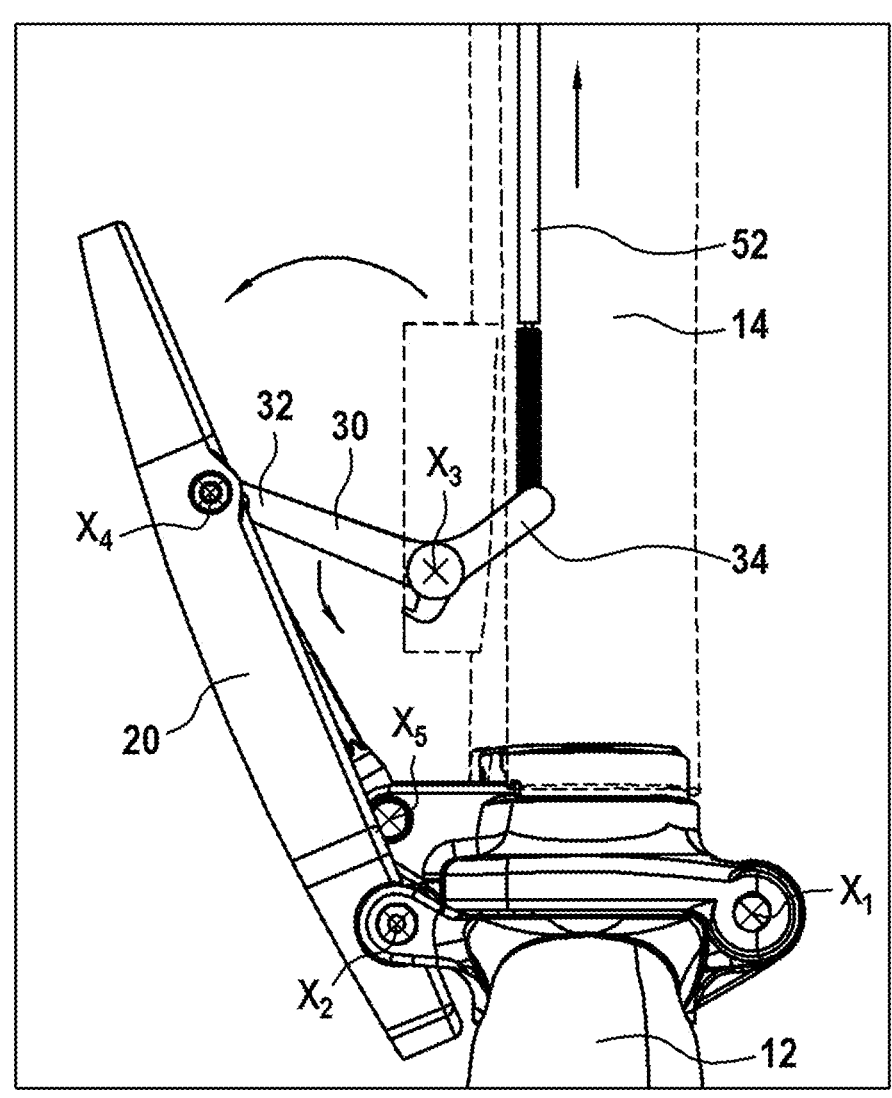

[Fig. 7]
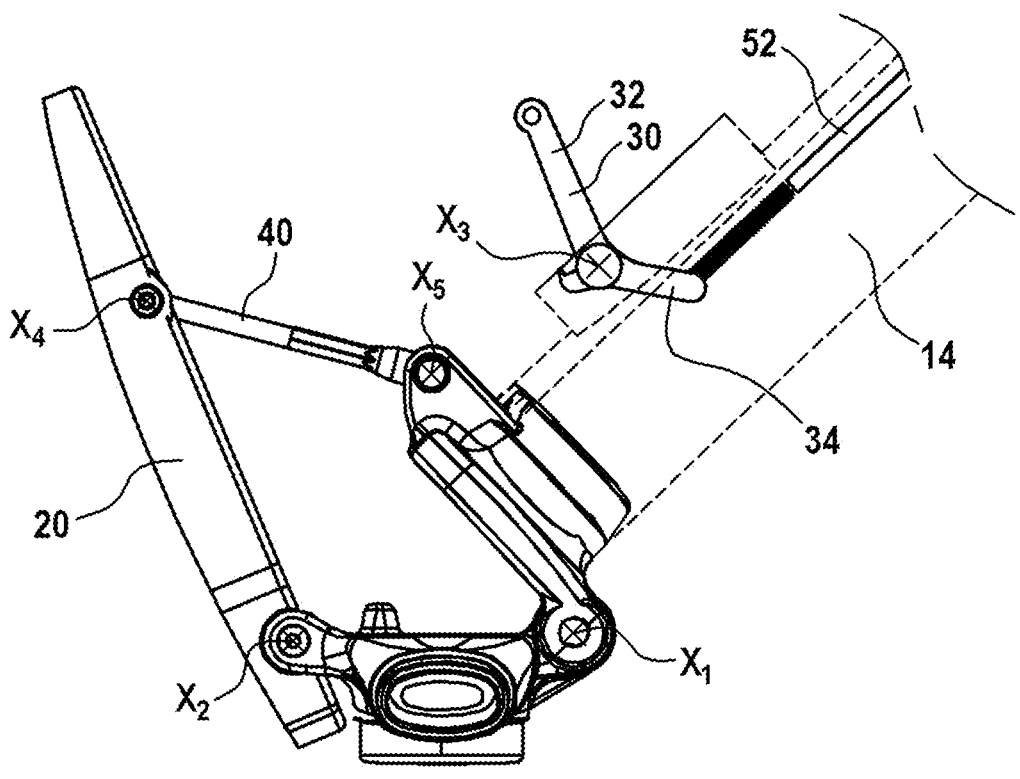
[Fig. 8]

[Fig. 9]
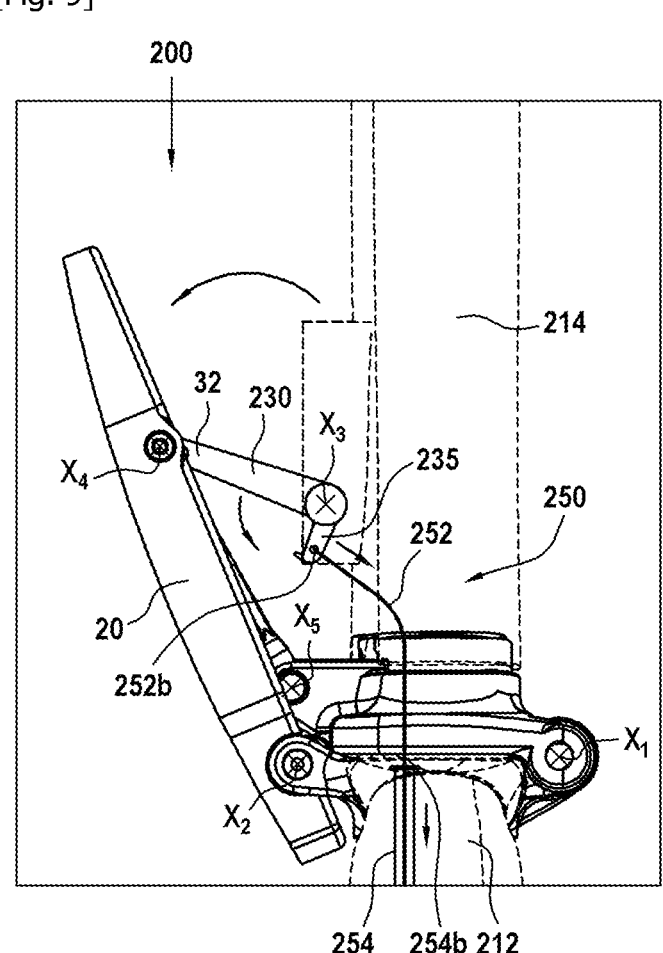

HINGE COMPRISING AN UNLOCKING MEMBER

TECHNICAL FIELD

This disclosure relates to the field of folding bicycles and more specifically the hinges of folding bicycles.

BACKGROUND

The frame, stem or seatpost of folding bicycles conventionally include a hinge including a first tube portion and a second tube portion, mounted pivotably with respect to the first tube portion. The second tube portion can be placed in a folded position and in an unfolded position.

These hinges of folding bicycles are generally equipped with a locking element making it possible to retain the second tube portion in the unfolded position when it is in the closed position. Such a locking element takes the form of a lever interacting with the two tube portions.

For safety reasons, such locking elements are retained in the closed position, optionally by means of a return member, when the bicycle is in use.

After use and when he wishes to fold the bicycle, the user is required to operate the locking element to place it in an open position, in which the locking element allows the second tube portion to be put in the folded position.

Putting the locking element in the open position by hand can prove complicated and require considerable effort from the user. The locking element can moreover be difficult to access, which further complicates its opening.

The user therefore risks not managing to correctly open the locking element and encountering difficulties in folding his bicycle. The user moreover risks injuring himself, for example getting his fingers caught, by handling such a locking element.

Furthermore, since the hinges are generally disposed near the wheels, the locking element may be covered in mud. The actuation of the lever can therefore soil the hands of the user.

SUMMARY

One aim of this disclosure is to make provision for a hinge for a folding bicycle remedying the aforementioned drawbacks.

To do this, the disclosure relates to a hinge for a folding bicycle, the hinge including:
- a first tube portion;
- a second tube portion mounted pivotably with respect to the first tube portion about a first axis of pivot between an unfolded position and a folded position;
- a locking element mounted pivotably to the first tube portion about a second axis of pivot, the locking element having at least one closed position in which it retains the second tube portion in the unfolded position and an open position in which it allows the displacement in the folded position of the second tube portion by the pivoting of the second tube portion with respect to the first tube portion about the first axis of pivot;
- an unlocking member having an neutral position and an active position, the unlocking member being configured to bring the locking element from its closed position into its open position when it is placed in the active position; and
- a device for actuating the unlocking member, configured to bring the unlocking member into the active position.

Without limitation, the first and second tube portions can be portions of the stem, the handlebar, the frame or the seatpost of the folding bicycle. They extend along a first longitudinal direction and a second longitudinal direction respectively. The first axis of pivot is preferably transverse to the first and second longitudinal directions.

In the folded position, the second longitudinal direction of the second tube portion forms an angle with the first longitudinal direction of the first tube portion. In the unfolded position, the second tube portion extends substantially in the extension of the first tube portion. The second longitudinal direction and the first longitudinal direction are then substantially parallel and preferably colinear. In the unfolded position, the first and second longitudinal directions can also be slightly inclined with respect to one another, while remaining in the extension of one another.

The locking element advantageously forms a lever mounted pivotably between the closed position and the open position. The second axis of pivot is preferably parallel to the first axis of pivot and transverse to the first longitudinal direction of the first tube portion.

When it is placed in the closed position, the locking element advantageously interacts with the second tube portion to retain it in the unfolded position and prevent its folding. The locking element is then near the second tube portion and preferably pressed against the second tube portion. It extends preferably substantially parallel to the second tube portion.

Without limitation, the hinge may include a connecting part having a first end part mounted pivotably to the end of the locking element and a second end part mounted pivotably to the second tube portion. In this closed position, the locking element exerts a force on the connecting part which transmits this force to the second tube portion. This force is directed substantially toward the first tube portion such that it tends to retain the second tube portion in the unfolded position.

In the open position, the locking element is preferably inclined with respect to the second tube portion.

Without limitation, the unlocking member can be mounted on the first tube portion or on the second tube portion. It extends preferably between the tube portion on which it is mounted and the locking element. The unlocking member preferably takes the form of a cam and is able to exert a force on the locking element when it is placed in the active position. This force drives the locking element from its closed position into its open position.

Without limitation, the unlocking member can define a rotational movement or else a translational movement between the neutral position and the active position.

Using the actuating device, the user can easily and quickly activate the unlocking member and therefore bring the locking element into the open position.

Thus, the unlocking member and the actuating device of the hinge according to the disclosure allow the user to avoid opening the locking element by hand. In other words, he is not required to bend over and directly operate the unlocking member. The forces to be exerted to put the locking element in the open position are reduced and the folding of the bicycle is facilitated.

Furthermore, the user does not risk soiling his hands or injuring himself insofar as he is not required to touch the locking element.

In the neutral position, the unlocking member does not drive the locking element into its open position, so that the latter can be placed in the closed position.

The actuating device can ably be remote with respect to the unlocking member. Without limitation, the actuating device can be disposed at the level of the handlebar or of the stem of the folding bicycle such that it is easily accessible and can be easily activated by the user, in particular when he is mounted on the bicycle.

Advantageously, the hinge includes a return device configured to bring the unlocking member from the active position into the neutral position, when the actuating device is not actuated. One benefit is to make it easier to put the unlocking member into the neutral position. Another benefit is to dispense with the risk of forgetting to bring the unlocking member into the neutral position, which avoids the unlocking member retaining the locking element in the open position when this is not desirable, for example when the bicycle is in use.

The risk of accidental folding of the bicycle is reduced and the security of the user is therefore improved.

Without limitation, the return device may include a return spring, for example a compression spring, interacting with the unlocking member.

Preferably, the unlocking member is mounted pivotably with respect to the second tube portion about a third axis of pivot, parallel to the second axis of pivot of the locking element. In other words, the unlocking member pivots between the neutral position and the active position along this third axis of pivot. When it is brought into the active position, by pivoting, the unlocking member advantageously exerts a pushing force on the locking element, having the consequence of pivoting the locking element from the closed position to the open position.

Without limitation, the rotating of the unlocking member in a first direction of rotation drives the rotation of the locking element in a second direction of rotation. In a variant, the rotation of the unlocking member in a first direction of rotation drives the rotation of the locking element in this same first direction of rotation.

The third axis of pivot is preferably parallel to the first axis of pivot and transverse to the second longitudinal direction of the second tube portion. When the second tube portion is unfolded, considered in projection in a plane passing through the first and second axes of pivot, the third axis of pivot extends advantageously between the first and second axes of pivot.

Between the neutral position and the active position, the unlocking member preferably describes a rotation of an angle between 60° and 180°, also preferably between 90° and 180°, also preferably a rotation of approximately 90°.

Advantageously, the second tube portion includes a mounting portion defining a housing, the unlocking member being mounted pivotably on the mounting portion and extending at least in part in the housing. One benefit of this mounting portion forming a housing is that it protects the unlocking member, particularly from the rain, which reduces the risks of wear.

Preferably, the unlocking member extends substantially entirely in the housing of the mounting portion when the unlocking member is in the neutral position. Still preferably, the unlocking member extends partly outside the housing when it is placed in the active position.

Furthermore, the mounting position encloses the unlocking member and forms a protection reducing the risks of injury and in particular of being caught by the unlocking member.

In the neutral position, the unlocking member extends preferably substantially entirely in the housing. In the active position, the unlocking member can protrude partly outside the housing.

The mounting portion preferably includes at least two side walls traversed by the third axis of pivot.

Preferably, the mounting portion protrudes from an outer surface of the second tube portion. One benefit is that it makes the unlocking member easily accessible if it is necessary to make repairs to it.

It will be understood that the mounting portion radially protrudes from the outer surface of the second tube portion. Without limitation, the mounting portion can extend entirely outside the second tube portion.

Preferably, the mounting portion extends at least partly inside the second tube portion. One benefit is improving the compactness of the hinge. Alternatively, but without limitation, the mounting portion can extend entirely inside the second tube portion.

Advantageously, the unlocking member includes a pushing portion configured to push the locking element in order to bring the locking element from its closed position into its open position, when the unlocking member is brought from its neutral position into its active position. The force exerted by the pushing portion of the unlocking member on the locking element has the consequence of pivoting the locking member from its closed position to its open position. This force is greater than the return force exerted by a possible spring tending to retain the locking element in the closed position.

The pushing portion preferably extends substantially parallel to the locking element and to the second tube portion when the unlocking member is in the neutral position.

Preferably, when the unlocking member is mounted pivotably with respect to the second tube portion, the pushing portion also pivots with respect to the second tube portion about the third axis of pivot. When the unlocking member is brought from the neutral position into the active position, the pushing portion pivots along the third axis of pivot and moves away from the second tube portion, in order to push the locking element.

Preferably, but without limitation, the pushing portion preferably extends between the third axis of pivot and the second tube portion, when the second tube portion is in the unfolded position. In a variant, the third axis of pivot can extend between the pushing portion and the second tube portion, when the second tube portion is in the unfolded position.

Advantageously, the unlocking member includes a pulling portion and the actuating device is configured to pull on the pulling portion of the unlocking member in order to bring it into the active position. Without limitation, the traction exerted by the actuating device on the pulling portion can drive the displacement of the unlocking member in rotation or in translation.

The traction force is preferably directed toward the actuating device and in particular toward the handlebar of the bicycle, when the actuating device is mounted on the handlebar. The traction force is preferably oriented transversely to the third axis of pivot.

The pulling portion is used to greatly increase the force exerted by the actuating device, in the manner of a lever, thus facilitating the active positioning of the unlocking member and therefore the opening of the locking element.

Preferably, the pulling portion of the unlocking member extends radially from the third axis of pivot, such that the unlocking member is rotationally driven about the third axis of pivot when the actuating device pulls on the pulling portion.

Preferably the unlocking member includes an elbow portion located between the pulling portion and the pushing portion, the elbow portion being traversed by the third axis of pivot.

The pulling portion and the pushing portion therefore extend radially from the third axis of pivot and therefore transversely to the third axis of pivot.

The pulling portion and the pushing portion preferably extend transversely with respect to one another in such a way that the unlocking member is substantially "L"-shaped.

Preferably, the pulling portion and the pushing portion define an angle between 90° and 180°, still preferably between 110° and 140°, and still preferably an angle approximately equal to 120°.

The pulling portion preferably has a length less than half of the length of the pushing portion.

A traction force exerted on the pulling portion along a pulling direction substantially transversal to the third axis of pivot makes it possible to pivot the pulling portion and the pushing portion and therefore bring the unlocking member into the active position.

Advantageously, the pulling portion and the pushing portion of the unlocking member extend on either side of the mounting portion, when the unlocking member is in the active position. One benefit is the improvement of the compactness of the hinge.

Without limitation, the pulling portion and the pushing portion may extend on either side of a plane parallel to the second longitudinal direction of the second tube portion and passing through the third axis of pivot.

Preferably, but without limitation, considered in projection in a plane transverse to the second longitudinal direction of the second tube portion and passing through the third axis of pivot the pulling portion extends between the locking element and the third axis of pivot. The pulling portion then extends inside the second tube portion.

In a variant, but without limitation, considered in projection in such a plane transverse to the second longitudinal direction of the second tube portion and passing through the third axis of pivot, the third axis of pivot extends between the pulling portion and the locking element.

Preferably, the actuating device includes a control member and a cable portion having a first end linked to the control member and a second end linked to the pulling portion of the unlocking member.

An action on the control member drives the displacement of the cable portion to the control member, which has the effect of exerting a traction force on the pulling portion of the unlocking member. The pulling portion is then rotationally or translationally driven and the unlocking member is brought easily from the neutral position to the active position.

Without limitation, the cable portion can extend along the second tube portion or inside the second tube portion.

Advantageously but without limitation, the control member takes the form of a lever or a pivoting element, for example a handle.

The control member is preferably configured to be mounted near the handlebar of a folding bicycle. In this way the control member is accessible for the cyclist mounted on the bicycle. The folding of the second tube portion and therefore of the bicycle is facilitated.

The control member can also be disposed on the stem of the folding bicycle.

Preferably, the locking element includes a receiving portion and the unlocking member further includes a locking portion configured to interact with the receiving portion in order to retain the locking element in the closed position when the unlocking member is in the neutral position. The locking portion then performs a locking function and makes it possible to avoid the accidental opening of the locking element and therefore the accidental folding of the second tube portion with respect to the first tube portion. For the cyclist, the risks of injury are therefore reduced. Without limitation, the opening of the locking element is only possible by activating the unlocking member and therefore by acting on the actuating device.

Preferably, the receiving portion protrudes from an inner surface of the locking element.

The locking portion advantageously opposes the pivoting of the locking element into its open position.

Preferably, the locking portion and the receiving portion are configured such that the interaction between the locking portion and the receiving portion is interrupted when the unlocking member is brought into the active position. The putting of the unlocking member in the active position therefore makes it possible to perform the unlocking of the locking element while bringing the locking member into its open position.

Advantageously, the receiving portion also includes a shoulder and the locking portion has the shape of a hook including an engaging part configured to interact with the shoulder when the unlocking member is in the neutral position. One benefit is to more effectively lock the locking element in the closed position. When the unlocking member is in the neutral position and a force is exerted on the locking element aiming to bring it into the open position, the shoulder advantageously then abuts against the engaging part.

In a particularly advantageous aspect of the disclosure, considered in a plane perpendicular to the second axis of pivot, the shoulder and the engaging part extend radially with respect to a circle having as center the second axis of pivot and passing through the locking portion. One benefit is to improve the interaction between the engaging part and the shoulder to more effectively prevent the opening of the locking element when the unlocking member is in the neutral position.

Advantageously, the circle passes substantially through the third axis of pivot of the unlocking member with respect to the second tube portion. One benefit is that it limits the friction between the engaging part and the shoulder during the transition from the active position to the neutral position of the unlocking member and vice versa.

The disclosure also relates to a folding bicycle including at least one hinge as described previously.

Preferably, the folding bicycle further includes a second hinge as previously described, the device for actuating the unlocking member of this second hinge including an actuating cable having a first end part attached to one of the first and second tube portions of the first hinge, and a second end part linked to the unlocking member of the second hinge, the device for actuating the unlocking member of the second hinge being configured to bring the unlocking member of the second hinge into the active position when the second tube portion of the first hinge pivots with respect to the first tube portion of the first hinge.

One benefit is that it allows the easy activation of the unlocking member of the second hinge by pivoting the second tube portion of the first hinge with respect to the first tube portion of the first hinge. After placing the locking element of the first hinge in the open position, the user folds the second tube portion of the first hinge which leads to the opening of the locking element of the second hinge. The user is therefore not required to operate a separate control member to activate the unlocking member of the second hinge. In other words, the folding of the first hinge permits the folding of the second hinge, thus making it possible to perform a gradual folding of the bicycle.

Another benefit is that of reducing the risk of untimely folding of the second hinge, insofar as the unlocking member of the latter can only be brought into the active position after the folding of the first hinge.

The actuating cable advantageously extends in a sleeve. Without limitation, the activation of the unlocking member of the second hinge can be done by pulling on the actuating cable or by pushing on the sleeve inside which it extends.

The first and second hinges can be two hinges of the frame of the bicycle or else hinges of the seatpost or of the stem of the bicycle.

BRIEF DESCRIPTION OF THE DRAWINGS

The disclosure will be better understood on reading the following description of an embodiment of the disclosure given by way of non-limiting example, with reference to the appended drawings, wherein:

FIG. 1 illustrates a portion of a bicycle frame equipped with a hinge for a folding bicycle according to the disclosure;

FIG. 2 illustrates the hinge of FIG. 1, the unlocking member being in the neutral position;

FIG. 3 is a side view of the hinge of FIG. 1, the unlocking member being in the neutral position;

FIG. 4 illustrates the receiving portion and the locking portion of the hinge of FIG. 1;

FIG. 5 illustrates the hinge of FIG. 1, the unlocking member being in the active position;

FIG. 6 is a side view of the hinge of FIG. 1, the unlocking member being in the active position;

FIG. 7 illustrates the hinge of FIG. 1, the second tube portion being in the folded position;

FIG. 8 illustrates the first hinge of a variant of the bicycle of FIG. 1; and

FIG. 9 illustrates the second hinge of the bicycle of FIG. 8.

DESCRIPTION OF THE EMBODIMENTS

The disclosure relates to a hinge for a folding bicycle including an unlocking member making it possible to place a locking element in the open position when it is activated.

FIG. 1 illustrates a portion of a frame of a folding bicycle equipped with a hinge 10 according to the disclosure.

It can be seen that the hinge 10 includes a first tube portion 12, a second tube portion 14, a locking member 20, an unlocking member 30 and an actuating device 50.

In this non-limiting example, the first tube portion 12 and the second tube portion 14 are portions of the upper tube of the bicycle frame. Without departing from the scope of the disclosure, these first and second tube portions 12,14 may be tube portions of the seat rod, of the stem or else of the handlebar of the bicycle. As illustrated in FIG. 2, the first tube portion 12 is cylindrical and extends along a first longitudinal direction $Y_1$. The second tube portion 14 is also cylindrical and extends along a second longitudinal direction $Y_2$.

For reasons of visibility, the first and second tube portions 12,14 are illustrated in dotted lines and are shown transparent in FIGS. 1 to 7.

As can be seen on FIG. 2, the second tube portion 14 is mounted pivotably with respect to the first tube portion 12 about a first axis of pivot $X_1$, between a folded position and an unfolded position. In FIGS. 1 to 6, the second tube portion 14 is shown in the unfolded position, in which it extends in the extension of the first tube portion 12. In the folded position, illustrated in FIG. 7, the second tube portion 14 no longer extends in the extension of the first tube portion 12 and forms an angle with the latter.

The locking element 20 has substantially the shape of a rectangular parallelepiped. It forms a lever.

With reference to FIG. 2, it can be seen that the locking element 20 is mounted pivotably with respect to the first tube portion 12 along a second axis of pivot $X_2$. The first axis of pivot $X_1$ and the second axis $X_2$ of pivot are diametrically opposed and extend on either side of the first tube portion 12. They are moreover mutually parallel. A housing 22 is fashioned in the locking element 20.

The unlocking member 30 is mounted pivotably with respect to the second tube portion 14 along a third axis of pivot $X_3$. The third axis of pivot $X_3$ is parallel to the first and second axes of pivot $X_1,X_2$. More precisely, in this non-limiting example, the unlocking member 30 is mounted pivotably with respect to a mounting portion 16 of the second tube portion along this third axis of pivot.

The mounting portion 16 defines a housing 18 within which the unlocking member 30 extends in part. The mounting portion 16 includes two side walls traversed by the third axis of pivot $X_3$. In this non-limiting example, the mounting portion 16 protrudes from an outer surface 14a of the second tube portion 14.

The unlocking member 30 includes a pushing portion 32 configured to push the locking element 20. The unlocking member moreover includes a pulling portion 34 and an elbow portion 36 extending between the pushing portion 32 and the pulling portion 34. The elbow portion is traversed by the third axis of pivot $X_3$. The pushing portion 32 and the pulling portion 34 protrude radially from the third axis of pivot, transversely to the third axis of pivot $X_3$.

The pulling portion 34 and the pushing portion 32 extend transversely with respect to one another. They define an angle between 110° and 140°, preferably approximately equal to 120°. In addition, the unlocking member is substantially "L"-shaped.

In this non-limiting example, the pulling portion 34 extends in part inside the second tube portion 14, in a cavity fashioned in the second tube portion.

When the second tube portion 14 is in the unfolded position, as illustrated in FIGS. 1 to 6, the unlocking member 30 extends between the second tube portion 14 and the locking element 20. In addition, in this position and considered in projection in a plane passing through the first and second axes of pivot $X_1,X_2$, the third axis of pivot $X_3$ extends between the first and second axis of pivot. Furthermore, without limitation, when the second tube portion is unfolded and considered in the plane passing through the first and second axes of pivot $X_1,X_2$, the pulling portion extends between the third axis of pivot $X_3$ and the first axis of pivot $X_1$.

As illustrated in FIG. 1, the actuating device 50 includes a control member 54 and a cable portion 52 having a first end 52a linked to the control member and a second end 52b linked to the pulling portion 34 of the unlocking member 20.

In this non-limiting example, the hinge 10 further includes a connecting part 40 in the form of a rod, particularly illustrated in FIG. 5. The connecting part 40 has a first end part 40a mounted pivotably with respect to the end of the locking element 30 along a fourth axis of pivot $X_4$ and a second end part 40b mounted pivotably with respect to the second tube portion 14 along a fifth axis of pivot $X_5$.

The hinge 10 further includes a spring 60, visible in FIG. 1, configured to bring the locking element toward the second tube portion 14.

In FIGS. 2 and 3, the second tube portion 14 is in the unfolded position and the unlocking member 30 is in the neutral position. Moreover, the locking element 20 is in the closed position such that it retains the second tube portion 14 in the unfolded position.

More precisely, in the folded position, the locking element 20 is pressed against the mounting portion 16 of the second tube portion 14, and extends substantially parallel to the second longitudinal direction $Y_2$ of the second tube portion 14.

In FIG. 3, it can be seen that when the locking element 20 is in the closed position, the first, third and fourth axes of pivot $X_1$, $X_3$, $X_4$ extend on one and the same side of the plane passing through the second and fifth axes of pivot $X_2$, $X_5$.

With reference to FIG. 2, it can be seen that in this closed position, the connecting part 40 extends in the housing 22 fashioned in the locking element 20. The locking element 20 exerts a force on the first end part 40a of the connecting part 40, which transmits this force to the second tube portion 14. This force is directly substantially toward the first tube portion 12 such that it retains the first tube portion and the second tube portion in the unfolded position. If a force is exerted on the second tube portion 14, tending to bring the latter into the folded position, the force is transmitted to the locking element 20 via the connecting part 40. This force tends to bring the locking element closer to the second tube portion and therefore to retain the locking member in the closed position and the first and second tube portions in the unfolded position.

The locking element 20 therefore efficiently retains the first and second tube portions 12,14 in the unfolded position, even in the presence of a force tending to pivot the second tube portion 14 with respect to to the first tube portion 12.

In FIGS. 2 and 3, the locking element 30 is in the neutral position. Its pushing portion 34 extends substantially parallel to the second longitudinal direction $Y_2$ of the second tube portion 14. In this neutral position, the pushing portion 34 moreover extends inside the mounting portion 16 and substantially parallel to the locking element 20, such that it does not exert any pushing force on this latter.

As can be seen in FIG. 4, the unlocking member 30 further includes a locking portion 35 extending radially from the third axis of pivot $X_3$. This locking portion 35 forms an angle with the pushing portion 34 and the pulling portion 34, of an angle between 100 and 140°, preferably approximately equal to 120°. The locking portion 35 takes the form of a hook including an engaging part 37. The engaging part 37 extends tangentially to a circle passing through the locking portion 35 and the center of which is the axis $X_3$. The inner face of the locking element 20 is moreover equipped with a receiving portion 39 including a shoulder 41.

In the neutral position of the unlocking member 30, illustrated in FIG. 4, the engaging part 37 of the locking portion 35 interacts with the shoulder 41 to retain the locking element in the closed position.

Considered in a plane transverse to the second axis of pivot $X_2$, the shoulder 41 and the engaging part extend radially with respect to a circle C having as center the second axis of pivot and passing through the locking portion 35. One benefit is that, when the unlocking member 30 is in the neutral position and a force is exerted on the locking element 20 tending to pivot it into its open position, the shoulder abuts on the engaging part, effectively preventing the opening of the locking member.

It can moreover be seen that the circle C passes substantially through the third axis of pivot $X_3$ of the unlocking member 20 with respect to the second tube portion 14, facilitating the starting of the interaction and interruption of the interaction between the engaging portion 37 and the shoulder 41 when the unlocking member pivots.

To fold the second tube portion 14, the user must first place the locking element 20 in the open position. To do this the user actuates the actuating device 50 by operating the control member 54. This has the consequence of pulling on the cable portion 52, in the direction of the control member. A pulling force is exerted by the cable portion 52 on the pulling portion 34 of the unlocking member 30. The unlocking member 30 is then rotationally driven about the third axis of pivot $X_3$, in a first direction of rotation, all the way to an active position, as illustrated by the transition from the FIGS. 2 and 3 to the FIGS. 5 and 6.

When the unlocking member 30 is placed in the active position, its locking portion 35 pivots about the third axis of pivot $X_3$, such that the engaging portion 37 is no longer interacting with the shoulder 41 of the receiving portion 39. The locking portion 35 no longer prevents the putting of the locking element 20 into the open position.

Furthermore, when the unlocking member 30 is put in the active position, its pushing portion 32 also pivots about the third axis of pivot $X_3$ and bears on an inner surface, and more specifically on a bearing portion 24 of the locking element 20, visible in FIG. 5. Without limitation, the bearing portion 24 forms a single part with the receiving portion 39. The pushing portion 32, and in particular its distal end, pushes the locking element 20 in an opposite direction to the second tube portion 14. This pushing force drives the locking element 20 to rotate all the way to an open position illustrated in FIGS. 5 and 6.

Owing to the disclosure, the user can bring the locking element 30 into the open position by operating the actuating device 50 and does not need to touch the locking member.

As can be seen in FIG. 6, in the active position of the unlocking member 30, the pulling portion 34 and the pushing portion 32 extend on either side of the mounting portion 16 of the second tube portion 14. Furthermore, the pulling portion 34 and the pushing portion 32 extend on either side of a plane parallel to the second longitudinal direction $Y_2$ of the second tube portion and passing through the third axis of pivot $X_3$.

In the open position, the locking element 20 is separated and moved away from the second tube portion 14. The first $X_1$ and fourth $X_4$ axes of pivot then extend on either side of a plane passing through the second $X_2$ and fifth $X_5$ axes of pivot.

As illustrated in FIG. 7, the locking element 20 in the open position permits the pivoting of the second tube portion 14 with respect to the first tube portion 12 about the first axis of pivot $X_1$ and therefore the putting of the second tube portion in the folded position.

The hinge further includes a return device 56 configured to bring the unlocking member 30 from the active position into the neutral position, when the actuating device is not actuated. In this non-limiting example, the return device includes a spring 56, of compression spring type, disposed about the cable portion 52 and extending along the cable portion. The spring has a first end that is fixed with respect to the cable portion 52, bearing on a sleeve 58 in which the cable portion 52 extends. The spring further includes a second end bearing on the pulling portion 34 of the unlocking member.

When the unlocking member is in the neutral position, as illustrated in FIG. 3, the spring is not compressed. When the unlocking member is in the active position, the cable portion is pulled inside the sleeve such that the spring 56 is compressed. The spring then exerts a pushing force on the pulling portion 34, tending to bring the unlocking member 30 into the neutral position, as illustrated in FIG. 6.

Thus, when the cable portion 52 is no longer pulled, the spring 56 pivots the pulling portion such that the unlocking member returns to the neutral position.

FIGS. 8 and 9 illustrate a variant of a bicycle according to the disclosure, the bicycle including two hinges, namely a first hinge 100 illustrated in FIG. 8 and a second hinge 200 illustrated in FIG. 9. Without departing from the scope of the disclosure, and without limitation, these hinges 100,200 may be disposed on the frame, the stem or else the seatpost of the bicycle.

The first hinge 100, illustrated in FIG. 8, is similar to the hinge 10 of FIGS. 1 to 7. It includes a first tube portion 112 and a second tube portion 114 mounted pivotably with respect to the first tube portion.

The second hinge 200, illustrated in FIG. 9, includes a first tube portion 212, which is fixed with respect to the second tube portion 114 of the first hinge 100. The second hinge 200 further includes a second tube portion 214 which is mounted pivotably with respect to the first tube portion 212 about a first axis of pivot $X_1$.

This second hinge 200 differs from the first hinge in that the unlocking member 230 includes a locking portion 235 which also forms a pulling portion. Furthermore, the actuating device 250 of this second hinge 200 includes an actuating cable 252 having a first end part 252a and a second end part 252b.

In this non-limiting example, and as can be seen in FIG. 8, the first end part 252a of the actuating cable 252 is attached to the first tube portion 112 of the first hinge 100. To do this, the actuating cable 252 includes a cable head which is housed in a housing formed in the first tube portion 112. The second end part 252b of the actuating cable 252 is connected to the locking portion 235 of the unlocking member 230 of the second hinge 200. The actuating cable 252 extends inside a sleeve 254. This sleeve 254 has a first end part 254a bearing on a surface of the second tube portion 114 of the first hinge 100 forming a sleeve stop. The sleeve 254 moreover has a second end part 254b, opposite the first end part, bearing on a surface of the first tube portion 212 of the second hinge, forming a sleeve stop.

Without limitation, the actuating cable 252 and the sleeve 254 extend inside the second tube portion 114 of the first hinge 100 and inside the first tube portion 212 of the second hinge 200.

When the second tube portion 114 of the first hinge 100 pivots with respect to the first tube portion 112 of the first hinge, the second tube portion 114 pushes on the sleeve 254 while the cable head of the actuating cable 252 remains substantially immovable. Consequently, a traction force is exerted by the actuating cable 252 on the locking portion 235 of the unlocking member 230 of the second hinge 200.

The unlocking member 230 is rotationally driven with respect to the second tube portion 214 about the third axis of pivot $X_3$ and is brought into the active position. The unlocking member 230 then brings the locking element 20 of the second hinge 200 from its closed position into its open position thus permitting the folding of the second hinge.

In this non-limiting example, the activation of the unlocking member 230 is done by pushing on the sleeve 254. Alternatively, and without departing from the scope of the disclosure, the activation could be performed by pulling on the actuating cable 252.

The invention claimed is:

1. A hinge for a folding bicycle, said hinge comprising:
   a first tube portion;
   a second tube portion mounted pivotably with respect to the first tube portion about a first axis of pivot between an unfolded position and a folded position;
   a locking element mounted pivotably to the first tube portion about a second axis of pivot, the locking element having at least one closed position in which the locking element retains the second tube portion in the unfolded position and an open position in which the locking element allows the displacement in the folded position of the second tube portion by the pivoting of said second tube portion with respect to the first tube portion about the first axis of pivot;
   an unlocking member having a neutral position and an active position, the unlocking member being configured to bring the locking element from the closed position into the open position when the unlocking member is placed in the active position; and
   an actuating device for actuating the unlocking member, configured to exert a force on the unlocking member so as to bring the unlocking member into the active position.

2. The hinge as claimed in claim 1, comprising a return device configured to bring the unlocking member from the active position into the neutral position, when the actuating device is not actuated.

3. The hinge as claimed in claim 1, wherein the unlocking member is mounted pivotably with respect to the second tube portion about a third axis of pivot, parallel to the second axis of pivot of the locking element.

4. The hinge as claimed in claim 3, wherein the second tube portion comprises a mounting portion defining a housing, the unlocking member being mounted pivotably on said mounting portion and extending at least in part in said housing.

5. The hinge as claimed in claim 4, wherein the mounting portion protrudes from an outer surface of the second tube portion.

6. The hinge as claimed in claim 4, wherein the mounting portion extends at least in part inside the second tube portion.

7. The hinge as claimed in claim 1, wherein the unlocking member comprises a pushing portion configured to push the locking element in order to bring said locking element from the closed position into the open position, when the unlocking member is brought from the neutral position into the active position.

8. The hinge as claimed in claim 1, wherein the unlocking member comprises a pulling portion and wherein the actuating device is configured to pull on said pulling portion of the unlocking member in order to bring the unlocking member into the active position.

9. The hinge as claimed in claim 8, wherein the unlocking member is mounted pivotably with respect to the second tube portion about a third axis of pivot, parallel to the second axis of pivot of the locking element, and wherein the pulling portion of the unlocking member extends radially from the third axis of pivot, such that the unlocking member is rotationally driven about the third axis of pivot when the actuating device pulls on said pulling portion.

10. The hinge as claimed in claim 9, wherein the unlocking member comprises a pushing portion configured to push the locking element in order to bring said locking element from the closed position into the open position, when the unlocking member is brought from the neutral position into the active position, and wherein the unlocking member comprises an elbow portion located between the pulling portion and the pushing portion, said elbow portion being traversed by the third axis of pivot.

11. The hinge as claimed in claim 8, wherein the actuating device comprises a control member and a cable portion having a first end linked to the control member and a second end linked to the pulling portion of the unlocking member.

12. The hinge as claimed in claim 11, wherein the control member has the shape of a lever configured to be mounted near the handlebar of a folding bicycle.

13. The hinge as claimed in claim 1, wherein the locking element comprises a receiving portion and wherein the unlocking member further comprises a locking portion configured to interact with the receiving portion in order to retain the locking element in the closed position when the unlocking member is in the neutral position.

14. The hinge as claimed in claim 13, wherein the locking portion and the receiving portion are configured such that the interaction between said locking portion and said receiving portion is interrupted when the unlocking member is brought into the active position.

15. The hinge as claimed in claim 13, wherein the receiving portion comprises a shoulder and wherein the locking portion has the shape of a hook comprising an engaging part configured to interact with said shoulder when the unlocking member is in the neutral position.

16. The hinge as claimed in claim 15, wherein, considered in a plane perpendicular to the second axis of pivot, said shoulder and said engaging part extend radially with respect to a circle having as center the second axis of pivot and passing through said locking portion.

17. A folding bicycle comprising:
a frame; and
first hinge;
  wherein said first hinge comprises
    a first tube portion;
    a second tube portion mounted pivotably with respect to the first tube portion about a first axis of pivot between an unfolded position and a folded position;
    a locking element mounted pivotably to the first tube portion about a second axis of pivot, the locking element having at least one closed position in which the locking element retains the second tube portion in the unfolded position and an open position in which the locking element allows the displacement in the folded position of the second tube portion by the pivoting of said second tube portion with respect to the first tube portion about the first axis of pivot;
    an unlocking member having a neutral position and an active position, the unlocking member being configured to bring the locking element from the closed position into the open position when the unlocking member is placed in the active position; and
    an actuating device for actuating the unlocking member, configured to exert a force on the unlocking member so as to bring the unlocking member into the active position.

18. The folding bicycle as claimed in claim 17, further comprising:
  a second hinge,
  another actuating device for actuating an unlocking member of the second hinge, the another actuating device comprising an actuating cable having a first end part attached to one of the first and second tube portions of said first hinge, and a second end part linked to the unlocking member of the second hinge, said another actuating device for actuating the unlocking member of the second hinge being configured to bring the unlocking member of the second hinge into an active position when the second tube portion of the first hinge pivots with respect to the first tube portion of the first hinge.

19. A hinge for a folding bicycle, said hinge comprising:
a first tube portion;
a second tube portion mounted pivotably with respect to the first tube portion about a first axis of pivot between an unfolded position and a folded position;
a locking element mounted pivotably to the first tube portion about a second axis of pivot, the locking element having at least one closed position in which the locking element retains the second tube portion in the unfolded position and an open position in which the locking element allows the displacement in the folded position of the second tube portion by the pivoting of said second tube portion with respect to the first tube portion about the first axis of pivot;
an unlocking member having a neutral position and an active position and being mounted pivotably with respect to the second tube portion about a third axis of pivot, parallel to the second axis of pivot of the locking element, the unlocking member being configured to bring the locking element from the closed position into the open position when the unlocking member is placed in the active position; and
an actuating device for actuating the unlocking member, configured to bring the unlocking member into the active position.

20. A hinge for a folding bicycle, said hinge comprising:
a first tube portion;
a second tube portion mounted pivotably with respect to the first tube portion about a first axis of pivot between an unfolded position and a folded position;
a locking element mounted pivotably to the first tube portion about a second axis of pivot, the locking element having at least one closed position in which the locking element retains the second tube portion in the unfolded position and an open position in which the locking element allows the displacement in the folded position of the second tube portion by the pivoting of said second tube portion with respect to the first tube portion about the first axis of pivot;
an unlocking member having a neutral position and an active position, the unlocking member comprising a pushing portion configured to push the locking element in order to bring said locking element from the closed position into the open position, when the unlocking member is brought from the neutral position into the active position; and an actuating device for actuating the unlocking member, configured to bring the unlocking member into the active position.

21. A hinge for a folding bicycle, said hinge comprising:

a first tube portion;

a second tube portion mounted pivotably with respect to the first tube portion about a first axis of pivot between an unfolded position and a folded position;

a locking element mounted pivotably to the first tube portion about a second axis of pivot, the locking element having at least one closed position in which the locking element retains the second tube portion in the unfolded position and an open position in which the locking element allows the displacement in the folded position of the second tube portion by the pivoting of said second tube portion with respect to the first tube portion about the first axis of pivot;

an unlocking member mounted pivotably with respect to the second tube portion about a third axis of pivot, parallel to the second axis of pivot of the locking element, between a neutral position and an active position, the unlocking member comprising a pulling portion and being configured to bring the locking element from the closed position into the open position when the unlocking member is placed in the active position; and an actuating device for actuating the unlocking member, configured to pull on said pulling portion of the unlocking member in order bring the unlocking member into the active position, wherein the pulling portion of the unlocking member extends radially from the third axis of pivot, such that the unlocking member is rotationally driven about the third axis of pivot when the actuating device pulls on said pulling portion.

22. A hinge for a folding bicycle, said hinge comprising:

a first tube portion;

a second tube portion mounted pivotably with respect to the first tube portion about a first axis of pivot between an unfolded position and a folded position;

a locking element comprising a receiving portion and being mounted pivotably to the first tube portion about a second axis of pivot, the locking element having at least one closed position in which the locking element retains the second tube portion in the unfolded position and an open position in which the locking element allows the displacement in the folded position of the second tube portion by the pivoting of said second tube portion with respect to the first tube portion about the first axis of pivot;

an unlocking member having a neutral position and an active position, the unlocking member being configured to bring the locking element from the closed position into the open position when the unlocking member is placed in the active position, the unlocking member further comprising a locking portion configured to interact with the receiving portion in order to retain the locking element in the closed position when the unlocking member is in the neutral position; and an actuating device for actuating the unlocking member, configured to bring the unlocking member into the active position.

* * * * *